US012509147B2

(12) United States Patent
Okazaki et al.

(10) Patent No.: US 12,509,147 B2
(45) Date of Patent: Dec. 30, 2025

(54) DRIVING SUPPORT DEVICE, DRIVING SUPPORT METHOD, AND STORAGE MEDIUM

(71) Applicant: HONDA MOTOR CO., LTD., Tokyo (JP)

(72) Inventors: Yuta Okazaki, Tokyo (JP); Saki Shindo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 18/195,954

(22) Filed: May 11, 2023

(65) Prior Publication Data

US 2023/0415810 A1 Dec. 28, 2023

(30) Foreign Application Priority Data

Jun. 23, 2022 (JP) ................................ 2022-100933

(51) Int. Cl.
B62D 6/00 (2006.01)
B62D 15/02 (2006.01)

(52) U.S. Cl.
CPC ........... B62D 6/001 (2013.01); B62D 15/025 (2013.01); B62D 15/029 (2013.01)

(58) Field of Classification Search
CPC ..... B62D 6/001; B62D 15/025; B62D 15/029
(Continued)

(56) References Cited

U.S. PATENT DOCUMENTS 6,487,501 B1* 11/2002 Jeon ..................... B62D 15/025
  702/167
6,778,890 B2* 8/2004 Shimakage ............ B62D 1/286
  180/443

(Continued)

FOREIGN PATENT DOCUMENTS

JP  11-139335  5/1999
JP  H11139335 A  *  5/1999  ............. B62K 28/06

(Continued)

OTHER PUBLICATIONS

Japanese Notice Of Allowance for Japanese Patent Application No. 2022-100933 mailed Mar. 12, 2024.

Primary Examiner — Kurt Philip Liethen
Assistant Examiner — Anthony Donald Taylor, Jr.
(74) Attorney, Agent, or Firm — Amin, Turocy & Watson, LLP

(57) ABSTRACT

A driving support device includes: a recognizer configured to recognize a surrounding situation of a vehicle; a steering determiner configured to determine whether an amount of steering which is received by a steering operator receiving a steering operation is equal to or less than a threshold value; a steering controller configured to control steering when it is determined that the vehicle tends to depart from the traveling lane; and an output controller configured to cause an output to output information for prompting a driver to grasp the steering operator. The steering controller causes the steering operator to perform a predetermined operation before the information is output from the output when the steering determiner determines that the amount of steering is equal to or less than the threshold value. The output controller curbs outputting of the information when a reaction to the predetermined operation is input by the driver.

9 Claims, 5 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2004/0262063 | A1* | 12/2004 | Kaufmann | B62D 15/025 180/169 |
| 2005/0030184 | A1* | 2/2005 | Victor | B60W 50/087 340/576 |
| 2012/0191266 | A1* | 7/2012 | Kluge | B62D 15/025 701/1 |
| 2016/0003630 | A1* | 1/2016 | Higuchi | G08G 1/167 701/41 |
| 2016/0288707 | A1* | 10/2016 | Matsumura | B60W 30/0956 |
| 2017/0008561 | A1* | 1/2017 | Kinugasa | B62D 15/025 |
| 2018/0037216 | A1* | 2/2018 | Otake | B60W 30/18109 |
| 2018/0107214 | A1* | 4/2018 | Chandy | B62D 15/025 |
| 2018/0345964 | A1* | 12/2018 | Fujii | B60W 50/14 |
| 2018/0362080 | A1* | 12/2018 | Shimizu | B60W 50/14 |
| 2019/0092321 | A1* | 3/2019 | Shimizu | B60W 40/08 |
| 2019/0310631 | A1* | 10/2019 | Naruse | B60W 50/14 |
| 2020/0148226 | A1* | 5/2020 | Kim | B60W 50/0097 |
| 2020/0255010 | A1 | 8/2020 | Fuji et al. | |
| 2020/0282984 | A1* | 9/2020 | Mizoguchi | B60W 60/005 |
| 2021/0001922 | A1* | 1/2021 | Aoyama | B62D 6/10 |
| 2022/0097696 | A1* | 3/2022 | Van Dan Elzen | B60W 50/14 |
| 2022/0105984 | A1* | 4/2022 | Kojo | B60W 30/12 |

FOREIGN PATENT DOCUMENTS

| | | | | |
|---|---|---|---|---|
| JP | 2009280077 A | * | 12/2009 | ............ B62D 6/00 |
| JP | 5497272 | | 5/2014 | |
| JP | 2017-016603 | | 1/2017 | |
| JP | 2018-022365 | | 2/2018 | |
| JP | 2018-203119 | | 12/2018 | |
| JP | 2019-001270 | | 1/2019 | |
| JP | 2021-151869 | | 9/2021 | |
| JP | 2022-060078 | | 4/2022 | |

* cited by examiner

DRIVING SUPPORT DEVICE, DRIVING SUPPORT METHOD, AND STORAGE MEDIUM

CROSS-REFERENCE TO RELATED APPLICATION

Priority is claimed on Japanese Patent Application No. 2022-100933, filed Jun. 23, 2022, the content of which is incorporated herein by reference.

BACKGROUND

Field of the Invention

The present invention relates to a driving support device, a driving support method, and a storage medium.

Description of Related Art

Recently, countermeasures for providing an access to a sustainable transportation system in which vulnerable persons out of traffic participants are considered have been actively studied. In order to realize such countermeasures, focus has been concentrated on research and development for further improving safety or convenience of traffic through research and development on driving support technology. In this regard, a technique of a lane keeping assistance system (LKAS) applying a pulse-like torque in a direction in which departure is prevented to a steering mechanism when it is determined that a vehicle is likely to depart from a traveling lane and outputting an alarm when it is determined that a driver's force of grasping a steering wheel has decreased on the basis of an amount of displacement of a steering angle at the time of application of the torque is disclosed in the related art (for example, Japanese Patent No. 5497272).

SUMMARY

In the driving support technology according to the related art, in a situation in which a vehicle is traveling on a straight road or the like, since an amount of steering (an amount of assist) on the LKAS side and an amount of steering by a driver are both small, it may be erroneously determined that the driver is not grasping the steering wheel even if the driver is grasping the steering wheel and unnecessary control for outputting an alarm or the like may be performed. Accordingly, there is a problem in that appropriate driving support may not be performed for the driver while driving support such as lane keeping is being performed.

An objective of the present invention is to provide a driving support device, a driving support method, and a storage medium that can perform appropriate driving support for a driver in order to solve the aforementioned problem. Another objective is to contribute to advancement of a sustainable transportation system.

A driving support device, a driving support method, and a storage medium according to the present invention employ the following configurations.

(1) A driving support device according to an aspect of the present invention is a driving support device including: a recognizer configured to recognize a surrounding situation of a vehicle; a steering determiner configured to determine whether an amount of steering which is received by a steering operator receiving a steering operation of a driver on the vehicle while traveling for a predetermined time or in a predetermined distance is equal to or less than a threshold value; a steering controller configured to control at least steering of the vehicle such that the vehicle travels in a traveling lane when it is determined that the vehicle tends to depart from the traveling lane on the basis of a recognition result from the recognizer; and an output controller configured to cause an output to output information for prompting the driver to grasp the steering operator when the steering determiner determines that the amount of steering is equal to or less than the threshold value, wherein the steering controller causes the steering operator to perform a predetermined operation before the information is output from the output when the steering determiner determines that the amount of steering is equal to or less than the threshold value, and the output controller curbs outputting of the information when a reaction to the predetermined operation is input by the driver.

(2) A driving support device according to another aspect of the present invention is a driving support device including: a recognizer configured to recognize a surrounding situation of a vehicle; a steering determiner configured to determine whether an amount of steering which is received by a steering operator receiving a steering operation of a driver on the vehicle while traveling for a predetermined time or in a predetermined distance is equal to or less than a threshold value; a steering controller configured to control at least steering of the vehicle such that the vehicle travels in a traveling lane when it is determined that the vehicle tends to depart from the traveling lane on the basis of a recognition result from the recognizer; and an output controller configured to cause an output to output information for prompting the driver to grasp the steering operator when the steering determiner determines that the amount of steering is equal to or less than the threshold value, wherein the output controller curbs outputting of the information from the output when the steering determiner determines that the amount of steering is equal to or less than the threshold value but when the driver grasps the steering operator and the traveling lane of the vehicle recognized by the recognizer has a predetermined shape.

(3) In the aspect of (1), the output controller may cause the output to output the information when a reaction to the predetermined operation is not input by the driver.

(4) In the aspect of (1), the output controller may cause the output to output the information for prompting the driver to grasp the steering operator without controlling the steering determiner such that the steering operator performs the predetermined operation when the steering determiner determines that the amount of steering is equal to or less than the threshold value and when the driver does not grasp the steering operator or the traveling lane of the vehicle recognized by the recognizer does not have the predetermined shape.

(5) In the aspect of (1), the steering controller may cause the steering operator to perform the predetermined operation before the information is output from the output when the steering determiner determines that the amount of steering is equal to or less than the threshold value and when the traveling lane of the vehicle recognized by the recognizer has the predetermined shape.

(6) A driving support device according to another aspect of the present invention is a driving support device including: a recognizer configured to recognize a surrounding situation of a vehicle; a steering determiner configured to determine whether an amount of steering which is received by a steering operator receiving a steering operation of a driver on a vehicle while traveling for a predetermined time or in a predetermined distance is equal to or less than a threshold value; and an output controller configured to cause an output to output information for prompting the driver to grasp the steering operator when the steering determiner determines that the amount of steering is equal to or less than the threshold value, wherein the output controller causes the steering operator to perform a predetermined operation before the information is output from the output when the steering determiner determines that the amount of steering is equal to or less than the threshold value, and curbs outputting of the information when a reaction to the predetermined operation is input by the driver.

(7) A driving support device according to another aspect of the present invention is a driving support device including: a recognizer configured to recognize a surrounding situation of a vehicle; a steering determiner configured to determine whether an amount of steering which is received by a steering operator receiving a steering operation of a driver on the vehicle while traveling for a predetermined time or in a predetermined distance is equal to or less than a threshold value; and an output controller configured to cause an output to output information for prompting the driver to grasp the steering operator when the steering determiner determines that the amount of steering is equal to or less than the threshold value, wherein the output controller curbs outputting of the information from the output when the steering determiner determines that the amount of steering is equal to or less than the threshold value but when the driver grasps the steering operator and the traveling lane of the vehicle recognized by the recognizer has a predetermined shape.

(8) A driving support method according to another aspect of the present invention is a driving support method that is performed by a computer, the driving support method including: recognizing a surrounding situation of a vehicle; determining whether an amount of steering which is received by a steering operator receiving a steering operation of a driver on the vehicle while traveling for a predetermined time or in a predetermined distance is equal to or less than a threshold value; controlling at least steering of the vehicle such that the vehicle travels in a traveling lane when it is determined that the vehicle tends to depart from the traveling lane on the basis of a recognition result; causing an output to output information for prompting the driver to grasp the steering operator when it is determined that the amount of steering is equal to or less than the threshold value; causing the steering operator to perform a predetermined operation before the information is output from the output when it is determined that the amount of steering is equal to or less than the threshold value; and curbing outputting of the information when a reaction to the predetermined operation is input by the driver.

(9) A storage medium according to another aspect of the present invention is a non-transitory computer-readable storage medium storing a program, the program causing a computer to perform: recognizing a surrounding situation of a vehicle; determining whether an amount of steering which is received by a steering operator receiving a steering operation of a driver on the vehicle while traveling for a predetermined time or in a predetermined distance is equal to or less than a threshold value; controlling at least steering of the vehicle such that the vehicle travels in a traveling lane when it is determined that the vehicle tends to depart from the traveling lane on the basis of a recognition result; causing an output to output information for prompting the driver to grasp the steering operator when it is determined that the amount of steering is equal to or less than the threshold value; causing the steering operator to perform a predetermined operation before the information is output from the output when it is determined that the amount of steering is equal to or less than the threshold value; and curbing outputting of the information when a reaction to the predetermined operation is input by the driver.

According to the aspects of (1) to (9), it is possible to perform appropriate driving support for a driver.

DESCRIPTION OF EMBODIMENTS

Hereinafter, a driving support device, a driving support method, and a storage medium according to an embodiment of the present invention will be described with reference to the accompanying drawings.

Entire Configuration

Figure 1:
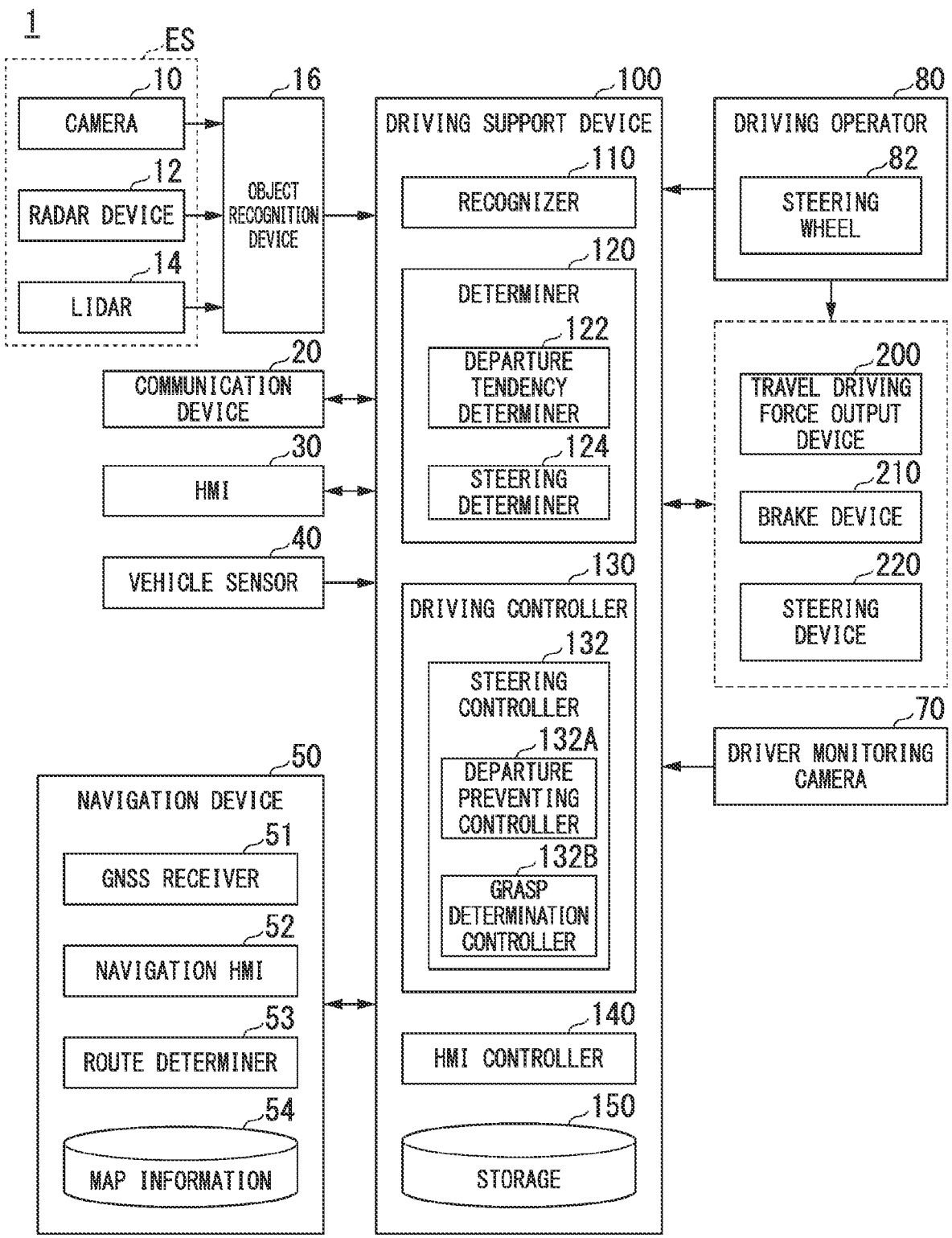
FIG. 1 is a diagram illustrating a configuration of a vehicle system employing a driving support device according to an embodiment.

FIG. 1 is a diagram illustrating a configuration of a vehicle system 1 employing a driving support device according to an embodiment. A vehicle in which the vehicle system 1 is mounted (hereinafter referred to as a vehicle M) is, for example, a vehicle with two wheels, three wheels, or four wheels, and a drive source thereof is an internal combustion engine such as a diesel engine or a gasoline engine, an electric motor, or a combination thereof. The electric motor operates using electric power generated by a power generator connected to the internal combustion engine or electric power discharged from a secondary battery or a fuel cell. For example, the driving support device may be applied to an autonomous-driving vehicle. Autonomous driving is, for example, automatically controlling one or both of steering and acceleration/deceleration of the vehicle M such that driving control is performed. The driving control of the vehicle M may include, for example, various types of driving support such as adaptive cruise control (ACC), LKAS, lane change assist (LCA), forward collision warning (FCW), and collision mitigation braking system (CMBS). In an autonomous driving vehicle, one or both of steering and acceleration/deceleration of the vehicle M may be controlled by manual driving of an occupant (a driver).

The vehicle system 1 includes, for example, a camera (an example of an imager) 10, a radar device 12, a Light Detection and Ranging (LIDAR) 14, an object recognition device 16, a communication device 20, a human-machine interface (HMI) 30, a vehicle sensor 40, a navigation device 50, a driver monitoring camera (an example of an internal imager) 70, a driving operator 80, a driving support device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example, and a part of the configuration may be omitted or another configuration may be added thereto. A combination of the camera 10, a radar device 12, and the LIDAR 14 is an example of an "external sensor ES." The external sensor ES may include the object recognition device 16 or may include another detector (for example, a sonar) that recognizes a surrounding situation of the vehicle M. The external sensor ES may have a configuration including only the camera 10 or may have a simple configuration including only the camera 10 and the radar device 12. The HMI 30 is an example of an "output."

The camera 10 is, for example, a digital camera using a solid-state imaging device such as a charge coupled device (CCD) or a complementary metal oxide semiconductor (CMOS). The camera 10 is attached to an arbitrary position on the vehicle M. For example, when the front view of the vehicle M is imaged, the camera 10 is attached to an upper part of a front windshield, a rear surface of a rearview mirror, or the like. When the rear view of the vehicle M is imaged, the camera 10 is attached to an upper part of a rear windshield, a backdoor, or the like. When the side view and a rear-side view of the vehicle M is imaged, the camera 10 is attached to a door mirror or the like. The camera 10 images the surroundings of the vehicle M, for example, periodically and repeatedly. The camera 10 may be a stereoscopic camera.

The radar device 12 radiates radio waves such as millimeter waves to the surroundings of the vehicle M, detects radio waves (reflected waves) reflected by an object, and detects at least a position (a distance and a direction) of the object. The radar device 12 is attached to an arbitrary position on the vehicle M. The radar device 12 may detect a position and a speed of an object using a frequency modulated continuous wave (FM-CW) method.

The LIDAR 14 radiates light (or electromagnetic waves of wavelengths close to light) to the surroundings of the vehicle M and measures scattered light. The LIDAR 14 detects a distance to an object on the basis of a time from radiation of light to reception of light. The radiated light is, for example, a pulse-like laser beam. The LIDAR 14 is attached to an arbitrary position on the vehicle M.

The object recognition device 16 performs a sensor fusion process on results of detection from some or all of the elements included in the external sensor ES and recognizes a position, a type, a speed, and the like of an object near the vehicle M. The object recognition device 16 outputs the result of recognition to the driving support device 100. The object recognition device 16 may output the results of detection from the external sensor ES to the driving support device 100 without any change. The object recognition device 16 may be omitted from the vehicle system 1.

The communication device 20 communicates with other vehicles near the vehicle M, for example, using a cellular network, a Wi-Fi network, Bluetooth (registered trademark), or dedicated short range communication (DSRC) or communicates with an external device via a radio base station and the like.

The HMI 30 presents various types of information to an occupant of the vehicle M and receives an input operation from the occupant under the control of an HMI controller 140. The HMI 30 includes, for example, a display device, a speaker, a microphone, a buzzer, a touch panel, and keys. The HMI 30 may include, for example, a switch (a driving support switch) for receiving an instruction indicating whether various types of driving support such as LKAS or ACC are to be performed.

The vehicle sensor 40 includes a vehicle speed sensor that detects a speed of the vehicle M, an acceleration sensor that detects an acceleration, a yaw rate sensor that detects an angular velocity around a vertical axis, and a direction sensor that detects a direction of the vehicle M. The vehicle sensor 40 may include a position sensor that acquires the position of the vehicle M. The position sensor is, for example, a sensor that acquires position information (longitude and latitude information) from a global positioning system (GPS) device. The position sensor may be a sensor that acquires position information using a global navigation satellite system (GNSS) receiver 51 of the navigation device 50. The vehicle sensor 40 may include a torque sensor or a turning angle sensor which will be described later.

The navigation device 50 includes, for example, the GNSS receiver 51, a navigation HMI 52, and a route determiner 53. The navigation device 50 stores map information 54 in a storage device such as a hard disk drive (HDD) or a flash memory. The GNSS receiver 51 identifies a position of the vehicle M on the basis of signals received from GNSS satellites. The position of the vehicle M may be identified or corrected by an inertial navigation system (INS) using the output of the vehicle sensor 40. The navigation HMI 52 includes a display device, a speaker, a touch panel, and keys. The whole navigation HMI 52 or a part thereof may be shared by the HMI 30. For example, the route determiner 53 determines a route (hereinafter, referred to as a "route on a map") from the position of the vehicle M identified by the GNSS receiver 51 (or an input arbitrary position) to a destination input by an occupant using the navigation HMI 52 with reference to the map information 54. The map information 54 is, for example, information in which a road shape is expressed by links indicating a road and nodes connected by the links. The map information 54 may include a curvature of a road or point of interest (POI) information. For example, the map information 54 may include information of center lines of lanes, information of boundaries of lanes (lane markings), and widths of lanes or may include road information (for example, an expressway or a regular road), traffic regulation information (for example, speed limits), address information (addresses and postal codes), facility information, and phone number information. The map information 54 may be updated from time to time by causing the communication device 20 to communicated with another device. The map information 54 may be stored in a storage of the driving support device 100 which will be described later.

The navigation device 50 may perform route guidance using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The driver monitoring camera 70 is, for example, a digital camera using a solid-state imaging device such as a CCD or a CMOS. The driver monitoring camera 70 is attached to an arbitrary position on the vehicle M at a position and in a direction in which an image including an upper half (particularly, the vicinity of the steering wheel 82) of an occupant (a driver) sitting on a driver's seat can be captured. For example, the driver monitoring camera 70 is attached to above the display device provided at the center of an instrument panel of the vehicle M. The driver monitoring camera 70 acquires an image obtained by imaging a cabin including the occupant of the vehicle M from the provided position at intervals of a predetermined period. Information acquired by the driver monitoring camera 70 is output to the driving support device 100.

The driving operator 80 includes, for example, an accelerator pedal, a brake pedal, a shift lever, and other operators in addition to the steering wheel 82. The steering wheel 82 is a steering operator that receives a steering operation of a driver on the vehicle M. A sensor that detects an amount of operation or whether an operation has been performed is attached to the driving operator 80, and results of detection from the sensor are output to the driving support device 100 or some or all of the travel driving force output device 200, the brake device 210, and the steering device 220. The operator does not have to have an annular shape and may have a shape of a deformed steering wheel, a joy stick, or a button.

The driving support device 100 includes, for example, a recognizer 110, a determiner 120, a driving controller 130, an HMI controller 140, and a storage 150. The recognizer 110, the determiner 120, the driving controller 130, and the HMI controller 140 are realized, for example, by causing a hardware processor such as a central processing unit (CPU) to execute programs (software). Some or all of such elements may be realized by hardware (a circuit unit which includes circuitry) such as a large scale integration (LSI), an application-specific integrated circuit (ASIC), or a field-programmable gate array (FPGA), or a graphics processing unit (GPU) or may be cooperatively realized by software and hardware. The programs may be stored in a storage device such as an HDD or a flash memory (a storage device including a non-transitory storage medium) of the driving support device 100 in advance, or may be stored in a removable storage medium such as a DVD or a CD-ROM and installed in the HDD or the flash memory of the driving support device 100 by setting the removable storage medium (a non-transitory storage medium) to a drive device. The HMI controller 140 is an example of an "output controller."

The storage 150 may be realized by the aforementioned various storage devices or a solid state drive (SSD), an electrically erasable programmable read only memory (EEPROM), a read only memory (ROM), a random access memory (RAM), or the like. The storage 150 stores, for example, programs and various types of other information. The storage 150 may store the map information 54.

The recognizer 110 recognizes a surrounding situation of the vehicle M on the basis of information input from the external sensor ES. For example, the recognizer 110 recognizes a position, a speed, and a state such as an acceleration of an object which is within a predetermined distance from the vehicle M on the basis of information input from the external sensor ES. The object is, for example, a traffic participant such as another vehicle, a bicycle, or a pedestrian. For example, a position of an object is recognized as a position in an absolute coordinate system with a representative point of the vehicle M (such as the center of gravity or the center of a drive shaft) as an origin and is used for control. A position of an object may be expressed as a representative point such as the center of gravity or a corner of the object or may be expressed as a drawn area. A "state" of an object may include an acceleration or a jerk of the object or a "moving state" (for example, whether lane change is being performed or whether lane change is going to be performed) thereof. The recognizer 110 may recognize a type of an object (another vehicle, a bicycle, or a pedestrian) on the basis of feature information such as a size, a shape, or a color of the object.

The recognizer 110 recognizes, for example, a lane (a traveling lane) in which the vehicle M is traveling. For example, the recognizer 110 recognizes right and left lane markings (hereinafter referred to as "lane markings") of the vehicle M from a camera image captured by the camera 10 and recognizes the traveling lane on the basis of positions of the recognized lane markings. The recognizer 110 may recognize the traveling lane by recognizing objects (traveling lane boundaries or road boundaries) capable of identifying a position of a lane such as edges of roadsides, curbstones, median strips, guard rails, fences, or walls in addition to the lane markings. The position of the vehicle M acquired from the navigation device 50 or processing results based on the INS may be considered in this recognition.

The recognizer 110 may recognize the traveling lane with reference to the map information 54 on the basis of position information of the vehicle M acquired from the vehicle sensor 40 or may recognize the traveling lane by comparing a pattern of lane makings near the vehicle M recognized from an image captured by the camera 10 with a pattern of lane markings (for example, arrangement of a solid line and a dotted line) acquired from the map information 54. The recognizer 110 may recognize a road shape of the traveling lane (for example, a shape type such as a straight lane or a curved lane or a curvature of a road). The recognizer 110 may recognize a neighboring lane near the traveling lane of the vehicle M, a stop line, an obstacle, a red signal, a toll gate, or other road events.

The recognizer 110 recognizes a position or a posture of the vehicle M with respect to the traveling lane at the time of recognition of the traveling lane. The recognizer 110 may recognize, for example, a separation of a reference point (the center or the center of gravity) of the vehicle M from the lane center and an angle of the traveling direction of the vehicle M with respect to a line formed by connecting the lane centers as the position and the posture of the vehicle M relative to the traveling lane. Instead, the recognizer 110 may recognize a position of a reference point of the vehicle M relative to one side line of the traveling lane (a lane marking or a road marking) or the like as the position of the vehicle M relative to the traveling lane.

The recognizer 110 realizes a function based on artificial intelligence (AI) and a function based on a predetermined model together. For example, a function of "recognizing a crossing" may be realized by performing recognition of a crossing based on deep learning or the like and recognition based on predetermined conditions (such as signals which can be pattern-matched and road signs), scoring both recognitions, and comprehensively evaluating the recognition scores.

The determiner 120 includes, for example, a departure tendency determiner 122 and a steering determiner 124. The departure tendency determiner 122 determines whether the vehicle M tends to depart from the traveling lane recognized by the recognizer 110 on the basis of the result of recognition from the recognizer 110. For example, the departure tendency determiner 122 acquires a distance (hereinafter referred to as a first distance) between the center (which may be the center of gravity, which is the same in the following description) of the vehicle M and the center line of the traveling lane in a state in which the vehicle M is performing LKAS control and determines that the vehicle M tends to depart from the traveling lane when the acquired first distance is equal to or greater than a process distance. The departure tendency determiner 122 may determine that the vehicle M tends to depart from the traveling lane when a rate of change (a rate of increase) of the first distance for a predetermined time is equal to or greater than a predetermined value.

The departure tendency determiner 122 may determine that the vehicle M tends to depart from the traveling lane when a distance from a lane marking of the traveling lane to the center of the vehicle M (hereinafter referred to as a second distance) instead of the distance from the center line of the traveling lane is less than a predetermined distance or when a rate of decrease of the second distance for a predetermined time is equal to or greater than a predetermined value. The predetermined distance may be a fixed distance or may be set to be variable depending on a width of the traveling lane, a vehicle width, a road type (for example, an expressway or a regular road), or a shape type.

The steering determiner 124 determines whether an amount of steering received for a predetermined time by the steering wheel 82 is equal to or less than a threshold value. The predetermined time may be a predetermined time from which a stop time of the vehicle M is excluded. The predetermined time may be a fixed time or may be set to be variable depending on a road type or a road shape of the traveling lane or a speed of the vehicle M. The amount of steering received for the predetermined time may be replaced with an amount of steering received while the vehicle M travels in a predetermined distance. In the following description, it is assumed that the amount of steering received for the predetermined time is used. For example, the steering determiner 124 determines whether an amount of steering detected for the predetermined time by a torque sensor that detects a torque (an amount of steering) corresponding to an operation angle of the steering wheel 82 by a driver is equal to or less than a threshold value.

The steering determiner 124 may determine whether a driver is grasping the steering wheel 82. Grasping of the steering wheel 82 includes a state in which the driver's hand is in contact with the steering wheel 82 (a state in which immediate manual driving is possible) as well as a state in which the driver grasps the steering wheel 82. For example, the steering determiner 124 analyzes an image captured by the driver monitoring camera 70 and determines whether the driver grasps the steering wheel 82 on the basis of the result of analysis. For example, when a position of the driver's hand or finger based on the result of analysis is located less than a predetermined distance from the position of the steering wheel 82 or when a concordance rate based on pattern matching with an image in which the driver grasps the steering wheel 82 is equal to or greater than a threshold value, the steering determiner 124 determines that the driver grasps the steering wheel 82. When the position of the driver's hand or finger is located equal to or greater than the predetermined distance from the position of the steering wheel 82 (for example, when both hands of the driver are located over the head) or when the concordance rate is less than the threshold value, the steering determiner 124 determines that the driver does not grasp the steering wheel 82. The steering determiner 124 may determine that the driver grasps the steering wheel 82 when an amount of steering for a predetermined time is greater than a threshold value and determine that the driver does not grasp the steering wheel 82 when the amount of steering is equal to or less than the threshold value.

The steering determiner 124 may determine whether the driver grasps the steering wheel 82 on the basis of whether there is a reaction to a predetermined operation performed on the steering wheel 82 by a grasp determination controller which will be described later. Details of the processes of the departure tendency determiner 122 and the steering determiner 124 will be described later.

The driving controller 130 automatically controls one or both of steering and acceleration/deceleration of the vehicle M on the basis of the result of recognition from the recognizer 110 or the result of determination from the determiner 120 such that driving control is performed. For example, when an operation for performing at least one of various types of driving support is received by the HMI 30, the driving controller 130 supports a driving operation of the vehicle M by an occupant of the vehicle M or controls traveling of the vehicle M on the basis of details of the received operation.

The driving controller 130 includes, for example, a steering controller 132. The steering controller 132 includes, for example, a departure prevention controller 132A and a grasp determination controller 132B. When an operation (an operation performed by an occupant) indicating that LKAS control is to be performed is received by the HMI 30, the departure prevention controller 132A performs at least LKAS control for controlling steering of the vehicle M on the basis of the result of determination from the departure tendency determiner 122 or the like such that the vehicle M travels without departing from the traveling lane. In the LKAS control according to this embodiment, it is assumed that at least a task for causing the driver to grasp the steering wheel 82 is imposed.

When the steering determiner 124 determines that the amount of steering received for the predetermined time by the steering wheel 82 is equal to or less than the threshold value, the grasp determination controller 132B causes the steering wheel 82 to perform a predetermined operation before information for prompting the driver to grasp the steering wheel 82 is output from the HMI 30. Details of the functions of the departure prevention controller 132A and the grasp determination controller 132B will be described later.

The driving controller 130 may perform control such as ACC, LCA, FCW, or CMBS on the basis of the result of recognition from the recognizer 110. For example, when an operation for instructing to perform ACC control is received by the HMI 30, the driving controller 130 performs driving control for causing the vehicle M to travel to follow a preceding vehicle. When an operation for instructing to perform LCA control is received by the HMI 30, the driving controller 130 sets a target position which does not come into contact with an object such as another vehicle at the center of a lane which is a lane change destination in a direction indicated by a direction indicator switch or the like, notifies an occupant of the set target position using the HMI 30, and causes the occupant to perform a steering operation on the vehicle M or performs steering control such that the vehicle M is positioned at the target position. When there is a likelihood of contact with an object through FCW control, the driving controller 130 warns the occupant using the HMI 30 or performs control for emergently stopping the vehicle M through CMBS control.

The HMI controller 140 notifies the occupant of predetermined information using the HMI 30 or acquires details of an operation from the occupant received using the HMI 30. The predetermined information includes, for example, information associated with traveling of the vehicle M such as information on the state of the vehicle M or information on driving control. The information on the state of the vehicle M includes, for example, information such as a speed, an engine rotation speed, and a shift position of the vehicle M. The information on driving control includes, for example, information indicating which driving control is performed, information indicating that driving control ends, or information for inquiring whether driving support is to be performed. The predetermined information may include information not associated with traveling control of the vehicle M such as television programs or contents (for example, videos) stored in a storage medium such as a DVD.

For example, when the steering determiner 124 determines that the amount of steering is equal to or less than the threshold value, the HMI controller 140 causes the HMI 30 to output information for prompting the driver to grasp the steering wheel 82. When it is determined that there is a reaction from the driver to a predetermined operation of the steering wheel 82 performed by the grasp determination controller 132B, the HMI controller 140 curbs outputting of the information for prompting the driver to grasp the steering wheel 82.

For example, the HMI controller 140 may generate an image including the aforementioned various types of information and display the generated image on the display device 32 of the HMI 30 or may generate sound indicating predetermined information and output the generated sound from the speaker of the HMI 30.

The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the driving support device 100 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the driving support device 100 or the information input from the driving operator 80 such that a brake torque based on a braking operation is output to vehicle wheels. The brake device 210 may include a mechanism for transmitting a hydraulic pressure generated by an operation on the brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the driving support device 100 such that the hydraulic pressure of the master cylinder is transmitted to the cylinder.

The steering device 220 includes, for example, a steering ECU and an electric motor (an assist motor). The electric motor changes a direction of turning wheels, for example, by applying a force to a rack-and-pinion mechanism (an example of a turning mechanism). The steering ECU drives the electric motor on the basis of the information input from the driving support device 100 or the information input from the driving operator 80 to change the direction of the turning wheels. Details of the steering device 220 according to this embodiment will be described later.

Determiner 120 and Steering Controller 132

Figure 2:
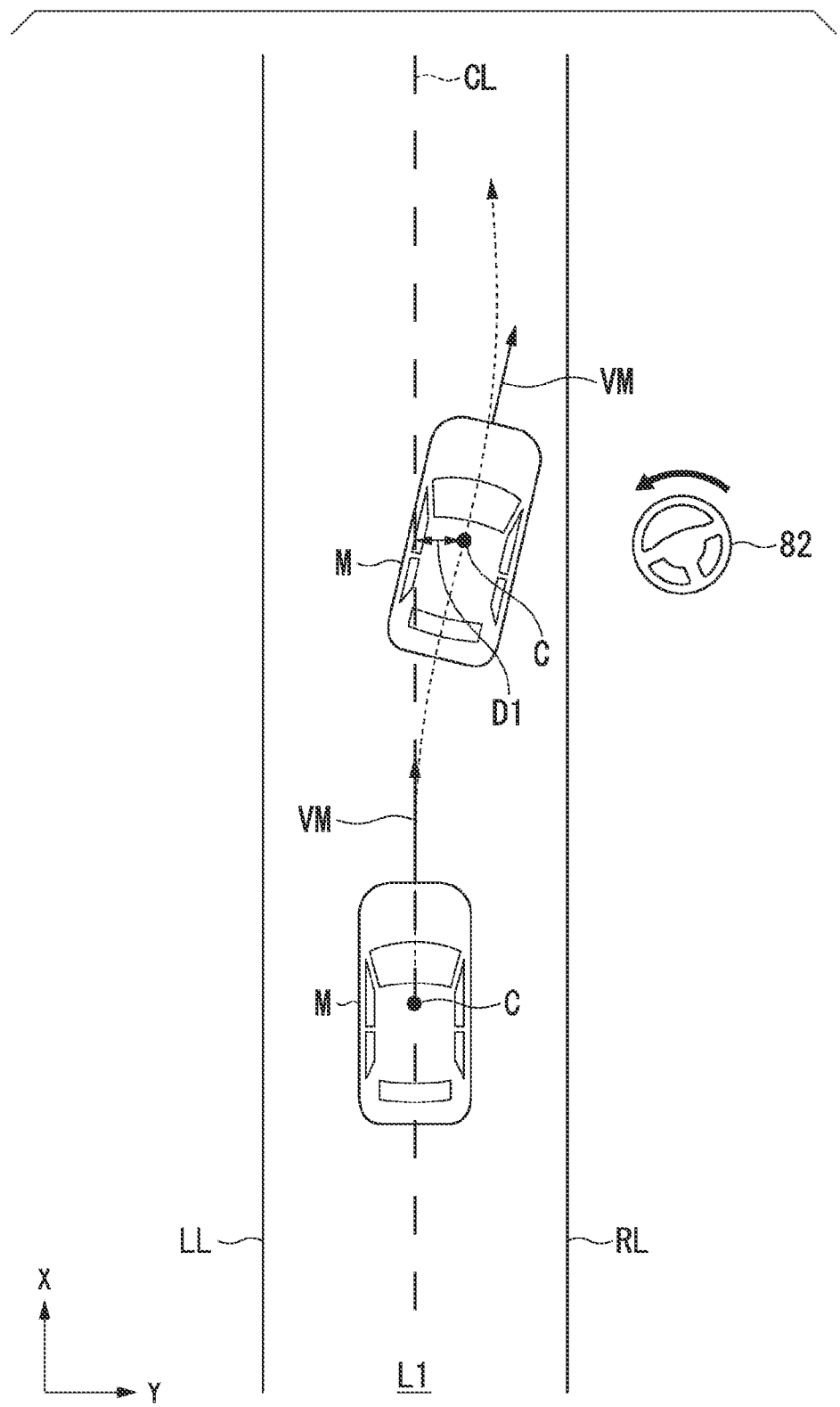
FIG. 2 is a diagram illustrating functions of a determiner and a steering controller.

Details of the functions of the determiner 120 (the departure tendency determiner 122 and the steering determiner 124) and the steering controller 132 (the departure prevention controller 132A and the grasp determination controller 132B) will be described below. FIG. 2 is a diagram illustrating the functions of the determiner 120 and the steering controller 132. In the example illustrated in FIG. 2, a vehicle M traveling at a speed VM on a lane L1 extending in an X-axis direction is illustrated in the drawing. The lane L1 is defined by lane markings LL and RL. In FIG. 2, a center line CL of the lane L1 is illustrated.

For example, when an instruction for performing LKAS control (an operation via the HMI 30) from a driver is received, the steering controller 132 performs LKAS control. While LKAS control is being performed, the departure tendency determiner 122 determines whether the vehicle M is tending to depart from the lane L1 on the basis of the driver's steering operation on the steering wheel 82. When it is determined that the vehicle M tends to depart, the departure prevention controller 132A controls the steering device 220 such that a target steering angle based on a difference (a distance D1) in the lateral direction (a lane width direction, a Y-axis direction in the drawing) from the center line CL is determined to allow the center C of the vehicle M to pass along the center line CL of the lane L1, and outputs a force in the opposite direction to the driver's operation direction to the steering wheel 82. In other words, the departure prevention controller 132A outputs a force (a steering reaction force) for rotating the steering wheel 82 in a direction toward the center line CL of the lane when seen from the center C of the vehicle M to the steering device 220. Accordingly, when the driver is steering the steering wheel 82 toward the center line CL of the lane (for example, the leftward direction) when seen from the center C of the vehicle M and the vehicle M needs to be moved toward the center line CL in a shorter time, the departure prevention controller 132A may output a steering force for rotating the steering wheel 82 in the same direction (the leftward direction) (or a steering reaction force for not rotating the steering wheel 82 in the opposite direction (the rightward direction)). As a result, the vehicle M can be moved to the vicinity of the center line CL of the lane L1 to prevent departure from the lane L1.

When the driver does is grasping the steering wheel 82 (in a hands-off state) while the LKAS control is being performed, the driving support device 100 outputs warning information including the information for prompting the driver to grasp the steering wheel 82. For example, the HMI controller 140 outputs the warning information from the HMI 30 when the steering determiner 124 determines that the amount of steering received for a predetermined time by the steering wheel 82 is equal to or less than the threshold value. The warning information is one or both of an image and sound including warning details.

Here, when the vehicle M is traveling on a straight road (for example, a road of which the curvature is equal to or less than a threshold value) illustrated in FIG. 2 and the driver actually grasps the steering wheel 82 (in a hands-on state), the amount of steering received for the predetermined time is equal to or less than the threshold value and thus there is a likelihood that the drive will be notified of the information for prompting the driver to grasp the steering wheel 82. Accordingly, in this embodiment, when the amount of steering on the steering wheel 82 is equal to or less than the threshold value and when the driver grasps the steering wheel and it is determined that the traveling lane of the vehicle M has a predetermined shape (for example, a straight road of which the curvature is equal to or less than the threshold value), outputting of the warning information is curbed.

For example, when the steering determiner 124 determines that the amount of steering of the steering wheel 82 is equal to or less than the threshold value, the grasp determination controller 132B causes the steering wheel 82 to perform a predetermined operation in order to determine whether the driver is grasping the steering wheel before the warning information is output from the HMI 30. The predetermined operation is, for example, an operation for rotating the steering wheel 82 in one or both of the rightward and leftward directions to achieve a predetermined steering angle. The predetermined operation may be made to be performed by the HMI controller 140 instead of the grasp determination controller 132B. The steering determiner 124 determines whether the driver is grasping the steering wheel 82 on the basis of whether there is the driver's reaction to the predetermined operation performed on the steering wheel 82.

Figure 3:
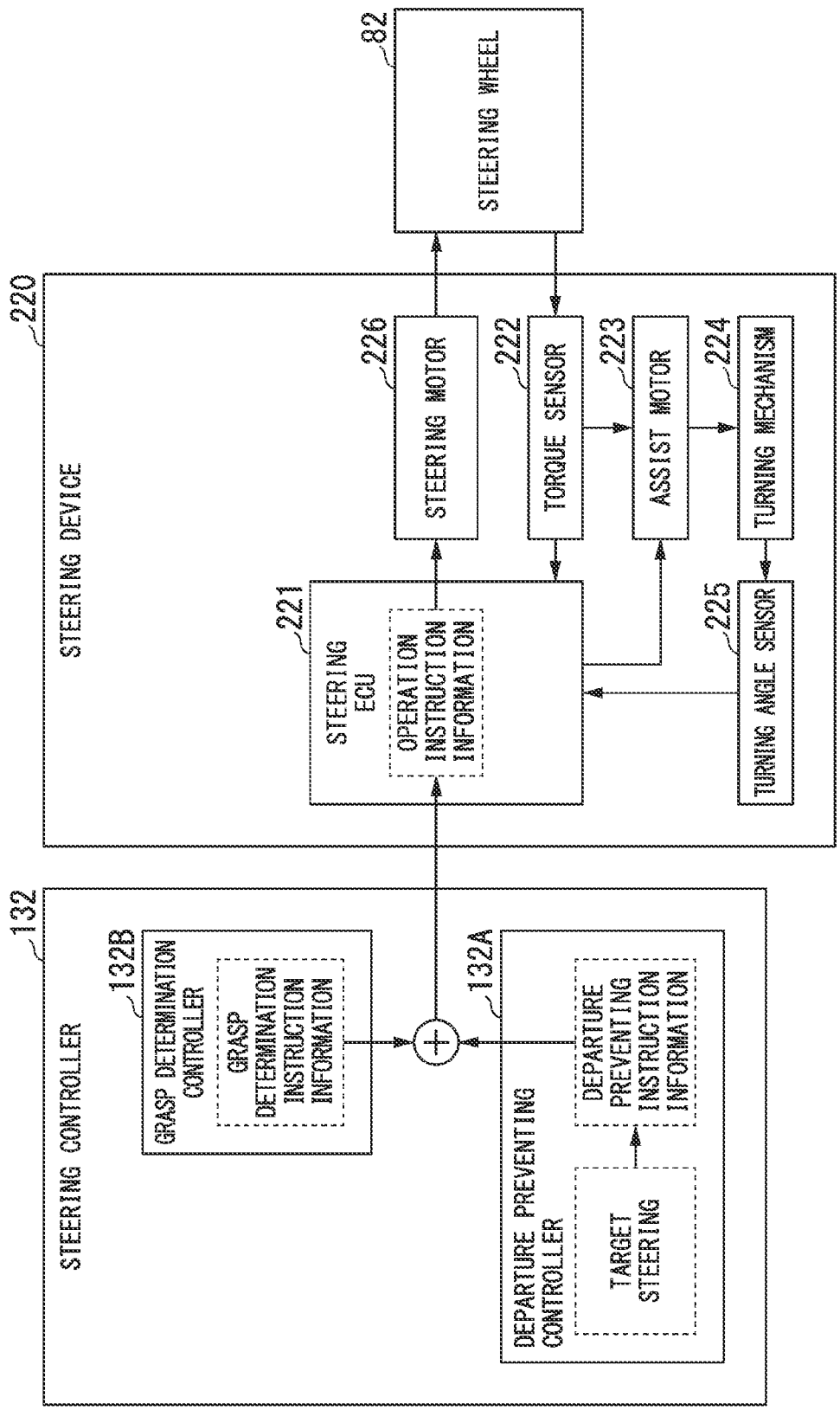
FIG. 3 is a diagram illustrating a configuration and an operation of a steering device according to the embodiment.

The configuration and operation of the steering device 220 that causes the steering wheel 82 to perform the predetermined operation will be described below. FIG. 3 is a diagram illustrating the configuration and operation of the steering device 220 according to this embodiment. In FIG. 3, the steering controller 132, the steering device 220, and the steering wheel 82 are illustrated. The steering device 220 includes, for example, a steering ECU 221, a torque sensor 222, an assist motor 223, a turning mechanism 224, a turning angle sensor 225, and a steering motor 226.

The steering ECU 221 controls all the elements of the steering device 220. For example, the steering ECU 221 acquires results of detection from the sensors in the steering device 220 and drives the motors or outputs the results of detection to the driving support device 100. The steering ECU 221 generates instruction information for operating the steering wheel 82 on the basis of information acquired from the driving support device 100.

The torque sensor 222 is attached to a steering shaft to which an operation performed on the steering wheel 82 is transmitted. The torque sensor 222 detects a torque (a steering torque) acting on the steering shaft on the basis of an operation angle of the steering wheel 82 rotated by the driver or a steering angle of the steering wheel 82 rotated (steered) by the steering motor 226. The steering torque detected by the torque sensor 222 is output to the steering ECU 221 and the assist motor 223.

The assist motor 223 assists with turning by outputting a torque to the turning mechanism 224 on the basis of the steering torque from the torque sensor 222 or under the control of the steering ECU 221. The turning mechanism 224 is, for example, a rack-and-pinion mechanism. The steering shaft and the turning mechanism 224 may be fixedly connected, may be disconnected, or may be connected via a clutch mechanism or the like. The turning angle sensor 225 detects an amount (for example, a rack stroke) indicating an angle (a turning angle) by which the turning wheels are driven by the turning mechanism 224 and outputs the detected amount to the steering ECU 221.

The steering motor 226 outputs a steering force (or a steering reaction force) to the steering wheel 82 by outputting a torque to the steering shaft under the control of the steering ECU 221.

When the driver's steering operation is received from the steering wheel 82, the steering device 220 assists with the steering force (torque) by driving the assist motor 223 to correspond to the amount of torque corresponding to the steering angle acquired from the steering operation and transmitting the torque to the turning mechanism 224 as an electric power steering (EPS) function. The steering ECU 221 controls driving (an assist force) from the assist motor 223 such that turning corresponding to the steering angle is performed on the basis of the results of detection from the torque sensor 222 and the turning angle sensor 225.

While LKAS control is being performed, the departure prevention controller 132A determines a target steering angle for locating the center C of the vehicle M at the center line CL of the traveling lane on the basis of a separation of the center C of the vehicle M from the center line CL of the traveling lane (a distance D1 in the road width direction) and an angle of the traveling direction of the vehicle M with respect to a line connecting the lane centers. Then, the departure prevention controller 132A generates instruction information for departure prevention for applying a steering force (a steering reaction force) to the steering wheel 82 on the basis of the target steering angle and outputs the generated instruction information to the steering device 220.

The steering ECU 221 generates operation instruction information for operating the steering motor 226 or the assist motor 223 on the basis of the instruction information for departure prevention and outputs the generated instruction information to the steering motor 226 or the assist motor 223. The steering ECU 221 may generate only operation instruction information for operating the steering motor 226 and output the generated operation instruction information to the steering motor 226. Accordingly, operating or turning of the steering wheel 82 corresponding to the target steering angle is performed. The steering ECU 221 controls the steering motor 226 or the assist motor 223 such that the steering angle approaches the target steering angle on the basis of the results of detection from the torque sensor 222 and the turning angle sensor 225. It is possible to prevent departure of the vehicle M from the traveling lane by repeatedly performing this control until the LKAS control ends.

While the LKAS control is being performed, the grasp determination controller 132B performs control when the amount of steering on the steering wheel 82 for a predetermined time is equal to or less than the threshold value. For example, the grasp determination controller 132B generates instruction information for instructing to perform a predetermined operation for determining the driver's grasping of the steering wheel 82 (instruction information for grasping determination) and outputs the generated instruction information to the steering device 220. The instruction information for grasping determination is, for example, information for rotating the steering wheel 82 by a predetermined amount in one or both of the rightward and leftward directions. The predetermined amount is, for example, an amount with which behavior of the vehicle M (for example, behavior by the LKAS control) is not much affected, may be a fixed amount or may be set to be variable depending on current behavior, a vehicle model, or a speed of the vehicle M, a road shape, a width of the traveling lane, or the like.

For example, the grasp determination controller 132B may change details of the instruction information for grasping determination on the basis of details of the instruction information for departure prevention generated by the departure prevention controller 132A. For example, when a steering instruction for moving the vehicle M to the right is included as the instruction information for departure prevention and a steering force in the rightward direction is additionally applied for grasping determination, the driver may perform a steering operation greatly in the rightward direction and there is a likelihood that the vehicle M will depart from the traveling lane. Accordingly, when the instruction information for departure prevention is information for performing the steering operation in one of the rightward and leftward directions, the grasp determination controller 132B generates instruction information for rotating the steering wheel 82 by a predetermined amount in the other direction as the instruction information for grasping determination. When the vehicle M is traveling on a straight road (the traveling lane of which the curvature is equal to or less than a threshold value), it is predicted that no steering (or a small amount of steering) is included in the instruction information for departure prevention. Accordingly, the grasp determination controller 132B generates instruction information for rotating the steering wheel 82 by a predetermined amount in the rightward and leftward directions as the instruction information for grasping determination. As a result, it is possible to apply a predetermined operation for grasping determination to the steering wheel 82 without affecting the LKAS control.

Similarly to that when the instruction information for departure prevention is input, the steering ECU 221 generates operation instruction information for operating the steering motor 226 or the assist motor 223 on the basis of the instruction information for grasping determination and outputs the generated instruction information to the steering motor 226 or the assist motor 223. The steering ECU 221 may generate the operation instruction information for operating only the steering motor 226 and output the generated operation instruction information to the steering motor 226.

The steering determiner 124 determines whether there is the driver's reaction (a reaction to grasping of the steering wheel 82) on the basis of the sensing result in response to the predetermined operation on the steering wheel 82 from the grasp determination controller 132B. For example, the steering determiner 124 determines whether there is the driver's reaction on the basis of a difference between an amount of torque applied to the steering motor 226 on the basis of the operation instruction information by the steering ECU 221 and an amount of torque acquired from the torque sensor 222 in response to an actual operation of the steering wheel 82. For example, the steering determiner 124 determines that there is a reaction from the driver when the difference is equal to or greater than the threshold value and determines that there is no reaction from the driver when the difference is less than the threshold value. The steering determiner 124 may determine that the driver is grasping the steering wheel 82 when there is a reaction from the driver and determine that the driver does not grasp the steering wheel when there is no reaction from the driver.

The HMI controller 140 outputs warning information including the information for prompting the driver to grasp the steering wheel 82 from the HMI 30 when the steering determiner 124 determines that there is no reaction from the driver and curbs outputting of the warning information from the HMI 30 when the steering determiner 124 determines that there is a reaction from the driver. Accordingly, even when an amount of steering from the driver is small (for example, a contact state) due to traveling on a straight road, it is possible to detect a hands-on state. Accordingly, in the hands-on state, it is possible to curb erroneous determination of the hands-off state and to curb unnecessary outputting of a warning. As a result, it is possible to perform appropriate driving support (more specifically, lane keeping assistance) for the driver.

As illustrated in FIG. 3, the steering controller 132 may output instruction information obtained by adding the instruction information for departure prevention generated by the departure prevention controller 132A and the instruction information for grasping determination generated by the grasp determination controller 132B to the steering ECU 221. Accordingly, since control of functions of the steering device 220 is not changed for each piece of instruction information, it is possible to curb an increase in installation cost, development cost, and the like. While departure prevention control is being performed, the vehicle M moves in the lateral direction and thus there is a low likelihood that the amount of steering of the steering wheel 82 for a predetermined time will be equal to or less than the threshold value. Accordingly, there is a low likelihood that the vehicle M will have large behavior even when instruction details are added and input to the steering ECU 221.

When it is determined that the driver does not grasp the steering wheel 82 even if a predetermined time elapses or the vehicle M travels a predetermined distance after the warning information has been output from the HMI 30, the steering controller 132 may perform control for ending the LKAS control, automatically stopping the vehicle M at a safe position, or the like. When such control is performed, the HMI controller 140 outputs information corresponding to the control details to the HMI 30.

The HMI controller 140 may output information indicating that departure prevention control is being performed by the departure prevention controller 132A and/or that grasping determination control is being performed by the grasp determination controller 132B to the HMI 30. Accordingly, it is possible to allow the driver to understand whether a steering reaction force from the steering wheel 82 is based on lane departure prevention or based on grasping determination. As a result, it is possible to prevent the driver from being made to perform an erroneous steering operation.

Process Flow

Figure 4:
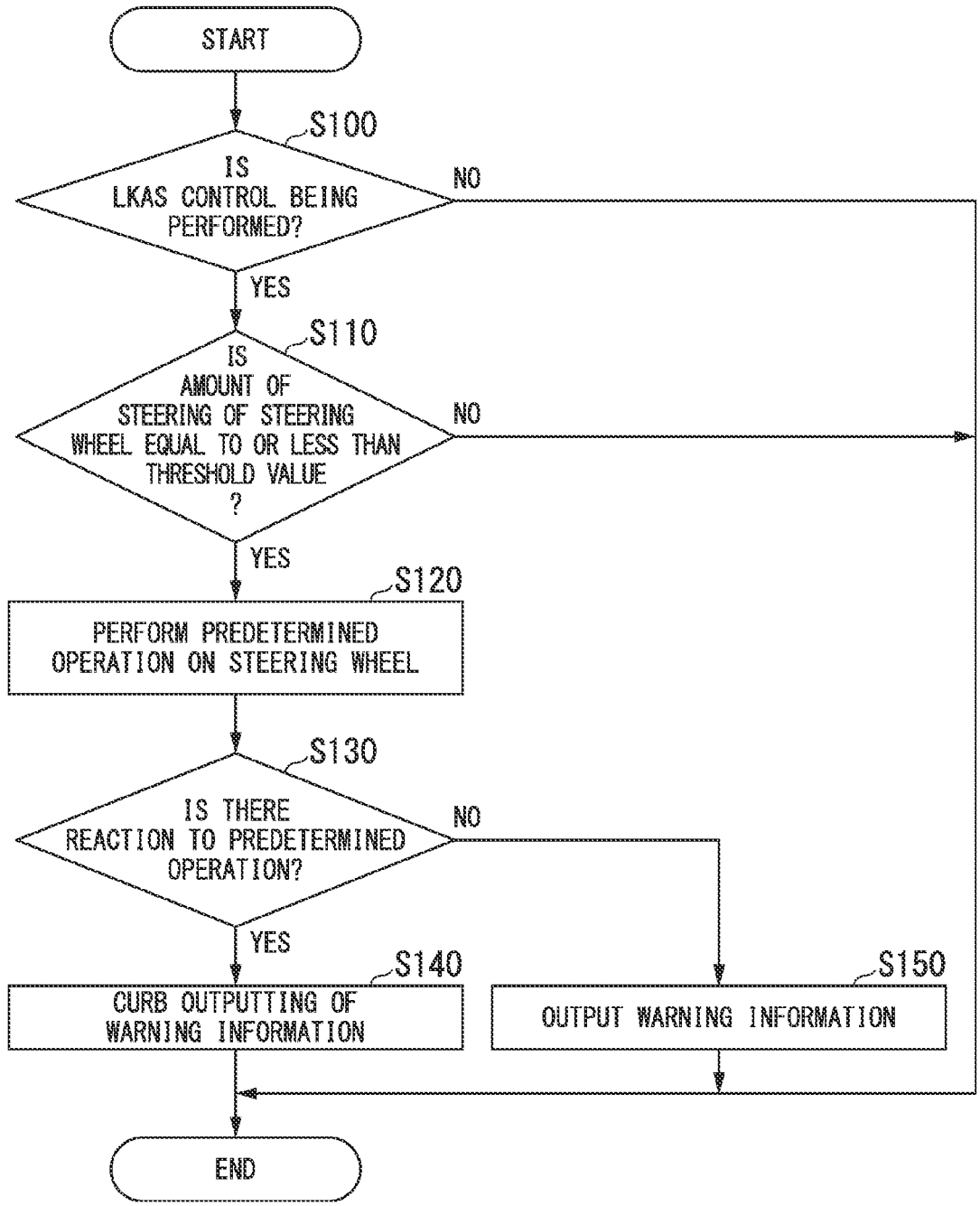
FIG. 4 is a flowchart illustrating an example of a process which is performed by the driving support device according to the embodiment.

FIG. 4 is a flowchart illustrating an example of a process which is performed by the driving support device 100 according to the embodiment. In the flowchart illustrated in FIG. 4, a grasping determination process of determining whether a driver grasps the steering wheel 82 and an output process of outputting warning information based on the grasping determination result out of various processes which are performed by the driving support device 100 will be mainly described. The flowchart illustrated in FIG. 4 may be repeatedly performed at intervals of a predetermined period or at predetermined timings. In the following process, it is assumed that grasping of the steering wheel 82 is included as a task which is applied to the driver while the LKAS control is being performed.

In the example illustrated in FIG. 4, the determiner 120 determines whether the LKAS control is being performed by the driving controller 130 (Step S100). When it is determined that the LKAS control is being performed, the steering determiner 124 determines whether an amount of steering of the driver performed on the steering wheel 82 is equal to or less than a threshold value (Step S110). When it is determined that the amount of steering of the driver performed on the steering wheel 82 is equal to or less than the threshold value, the grasp determination controller 132B causes the steering wheel 82 to perform a predetermined operation for grasping determination before warning information is output by the HMI control unit 140 (Step S120).

Then, the steering determiner 124 determines whether there is a reaction based on grasping of the driver in response to the predetermined operation performed by the grasp determination controller 132B (Step S130). When it is determined that there is a reaction, the HMI controller 140 curbs outputting of the warning information including information for prompting the driver to grasp the steering wheel 82 (Step S140). When it is determined that there is no reaction, the HMI controller 140 outputs the warning information from the HMI 30 (Step S150). Then, the process of this flowchart ends.

When it is determined in the process of Step S100 that the LKAS control is not being performed or when it is determined in the process of Step S110 that the amount of steering on the steering wheel 82 is not equal to or less than the threshold value, warning information does not need to be output and thus the process of this flowchart ends.

Modified Examples

For example, when the vehicle M is traveling on a road of which the curvature is equal to or less than a threshold value (for example, a straight road) and the driver is grasping the steering wheel 82, there is a high likelihood that the amount of steering for a predetermined time will be equal to or less than the threshold value. Accordingly, when the steering determiner 124 determines that the amount of steering for the predetermined time is equal to or less than the threshold value and when the driver is grasping the steering wheel 82 and the traveling lane of the vehicle recognized by the recognizer 110 has a predetermined shape (for example, a straight road of which the curvature is equal to or less than the threshold value), no steering operation (or a small amount of steering) is performed by the driver, and thus the steering controller 132 may determine that a task required for the driver at the time of performing of the LKAS control is satisfied and curb outputting of the warning information by the HMI controller 140.

Figure 5:
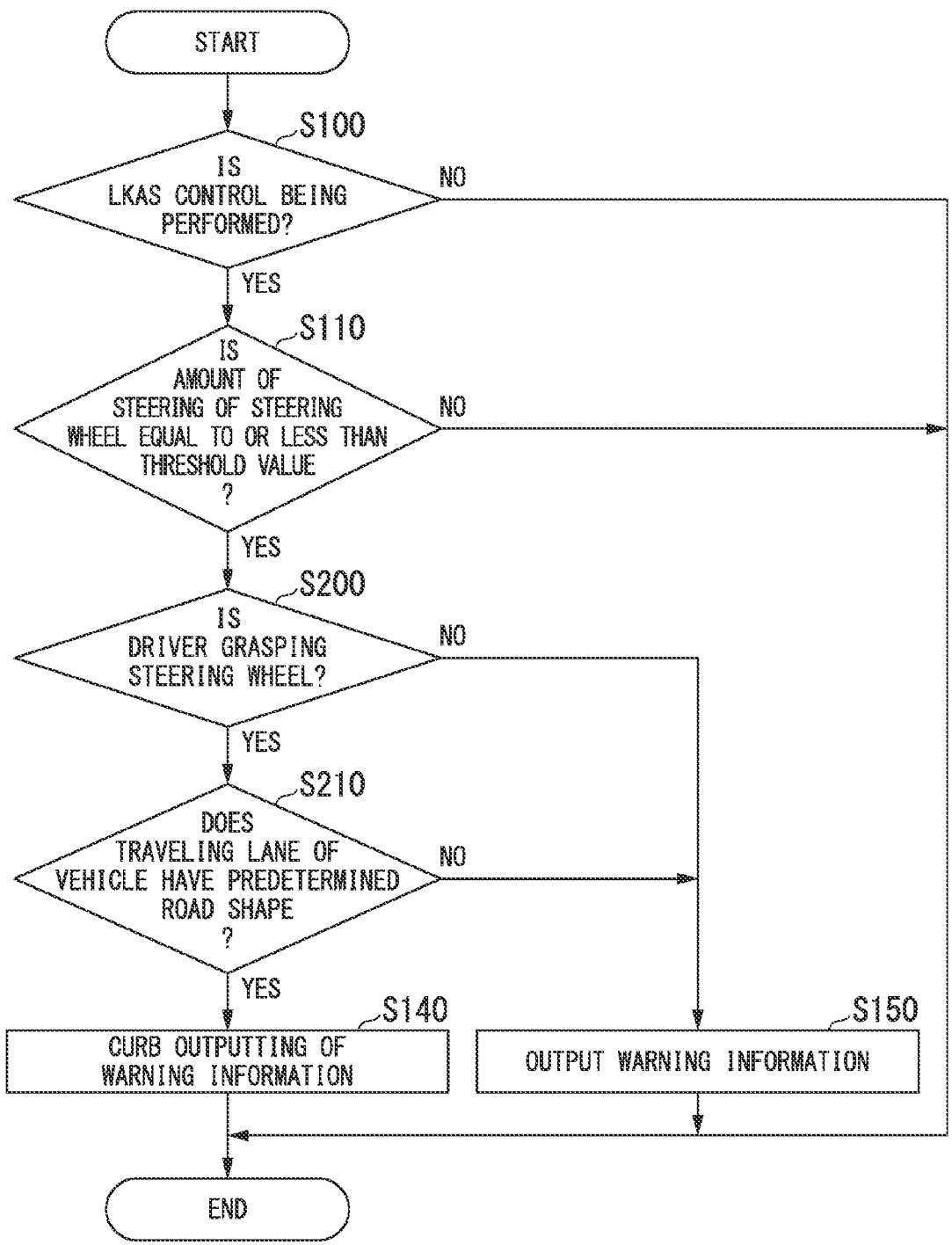
FIG. 5 is a flowchart illustrating an example of another process which is performed by the driving support device according to the embodiment.

FIG. 5 is a flowchart illustrating an example of another process which is performed by the driving support device 100 according to the embodiment. The processes of the flowchart illustrated in FIG. 5 is different from the processes of Steps S100 to S150 of the flowchart illustrated in FIG. 4 in that the processes of Steps S200 and S210 are performed instead of the processes of Steps S120 and S130. Accordingly, the processes of Steps S200 and S210 will be mainly described below.

When it is determined in the process of Step S110 in FIG. 5 that the amount of steering of the driver performed on the steering wheel 82 is equal to or less than the threshold value, the steering determiner 124 determines whether the driver is grasping the steering wheel 82, for example, on the basis of a result of analysis of an image captured by the driver monitoring camera 70 (Step S200). When it is determined that the steering wheel 82 is being grasped, the steering determiner 124 determines whether the traveling lane of the vehicle M has a predetermined road shape (for example, a straight road) (Step S210). When it is determined that the traveling lane of the vehicle M has the predetermined road shape, the HMI controller 140 curbs outputting of warning information including the information for prompting the driver to grasp the steering wheel 82 (Step S140).

When it is determined in Step S200 that the driver is not grasping the steering wheel 82 or when it is determined in Step S210 that the traveling lane of the vehicle M does not have the predetermined road shape, the HMI controller 140 causes the HMI 30 to output the warning information for prompting the driver to grasp the steering wheel 82.

Accordingly, it is possible to curb unnecessary outputting of warning information with a simpler configuration. As a result, it is possible to curb an increase in cost and to perform more appropriate driving support control. Some or all of the processes illustrated in FIGS. 4 and 5 may be included in another process.

In the embodiment, the predetermined operation may be an operation of operating a vibrator when the vibrator is provided in the steering wheel 82 instead of the operation of rotating the steering wheel 82. The predetermined operation may be an operation of moving the steering wheel 82 in an up-down direction or a forward-rearward direction in a view from the driver sitting on a driver's seat when a position adjusting mechanism capable of electrically adjusting the position of the steering wheel 82 is provided. In this case, the steering determiner 124 determines whether there is a driver's reaction on the basis of a difference between an amount of vibration performed by the vibrator (an instructed amount of vibration) and an actual amount of vibration sensed by the sensor of the steering wheel 82 or the like or a difference between an amount of movement performed by the position adjusting mechanism (an instructed amount of movement) and an actual amount of movement sensed by the sensor of the steering wheel 82 or the like.

When the steering determiner 124 determines that the amount of steering for the predetermined time is equal to or less than the threshold value and when the traveling lane of the vehicle M recognized by the recognizer 110 has the predetermined shape (for example, a straight road of which the curvature is equal to or less than a threshold value), the steering controller may cause the steering wheel 82 to perform a predetermined operation before warning information is output from the HMI 30. Accordingly, it is possible to efficiently perform grasping determination in a situation in which there is a high likelihood that the amount of steering for the predetermined time will be equal to or less than the threshold value.

According to the aforementioned embodiment, the driving support device 100 includes the recognizer 110 that recognizes the surrounding situation of the vehicle M, the steering determiner 124 that determines whether the amount of steering received by the steering wheel 82 receiving a driver's steering operation of the vehicle M while the vehicle M is traveling for a predetermined time or in a predetermined distance, the steering controller 132 that controls at least steering of the vehicle M such that the vehicle M travels in the traveling lane when the vehicle M tends to depart from the traveling lane on the basis of the result of recognition from the recognizer 110, and the HMI controller 140 that causes the HMI 30 to output information for prompting the driver to grasp the steering wheel 82 when the steering determiner 124 determines that the amount of steering is equal to or less than the threshold value, the steering controller 132 causes the steering wheel 82 to perform a predetermined operation before the information is output from the HMI 30 when the steering determiner 124 determines that the amount of steering is equal to or less than the threshold value, and the HMI controller 140 curbs outputting of the information when there is a reaction from the driver in response to the predetermined operation. Accordingly, it is possible to perform appropriate driving support for the driver. In addition, it is possible to contribute advancement of a sustainable transportation system.

Specifically, according to the embodiment, when a hands-off state is sensed while the LKAS control is being performed, it is possible to more appropriately determine whether the driver is grasping the steering wheel by inputting an operation to the steering wheel 82 from the system side that performs the LKAS control and causing the steering wheel 82 to move before the warning information is output. Accordingly, when the amount of operation on the steering wheel 82 is small, it is possible to prevent an unnecessary warning from being output though the steering wheel 82 is being grasped. By appropriately detecting the hands-on state of the driver, it is possible to decrease the frequency of erroneous warning and to provide comfort traveling to the driver. According to this embodiment, it is possible to perform appropriate lane keeping assistance for the driver.

According to the embodiment, it is possible to determine whether the driver grasps the steering wheel 82 using the system configuration for performing the LKAS control even with a configuration in which a grasp sensor such as a capacitance sensor is not provided in the steering wheel 82. Accordingly, according to the embodiment, it is possible to further improve a commercial value of an LKAS system.

The grasping determination process or the warning information outputting process in the embodiment may be performed as another driving support (for example, ACC control) including grasping of the steering wheel 82 as a task imposed on the driver while the vehicle is traveling instead of the LKAS control or may be performed simply as a grasping control function.

In this case, the driving support device 100 includes the steering determiner 124 that determines whether the amount of steering received by the steering wheel 82 while the vehicle is traveling for a predetermined time or in a predetermined distance is equal to or less than a threshold value and the HMI controller 140 that causes the HMI 30 to output information for prompting the driver to grasp the steering wheel 82 when the steering determiner 124 determines that the amount of steering is equal to or less than the threshold value. When the steering determiner 124 determines that the amount of steering is equal to or less than the threshold value, the HMI controller 140 causes the steering wheel 82 to perform a predetermined operation before information is output from the HMI 30 and curbs outputting of the information when there is a reaction from the driver in response to the predetermined operation.

The driving support device 100 may include, for example, the recognizer 110 that recognizes the surrounding situation of the vehicle M, the steering determiner 124 that determines whether the amount of steering received by the steering wheel 82 while the vehicle is traveling for a predetermined time or in a predetermined distance is equal to or less than a threshold value, and the HMI controller 140 that causes the HMI 30 to output information for prompting the driver to grasp the steering wheel 82 when the steering determiner 124 determines that the amount of steering is equal to or less than the threshold value. In this case, when the steering determiner 124 determines that the amount of steering is equal to or less than the threshold value and when the driver is grasping the steering wheel 82 and the traveling lane of the vehicle M recognized by the recognizer 110 has a predetermined shape, the HMI controller 140 curbs outputting of the information from the HMI 30. Accordingly, according to the embodiment, it is possible to perform appropriate driving support for a driver.

The above-mentioned embodiment can be expressed as follows:

A driving support device comprising:
a storage medium configured to store computer-readable instructions; and
a processor connected to the storage medium,
wherein the processor executes the computer-readable instructions to perform:
recognizing a surrounding situation of a vehicle;
determining whether an amount of steering which is received by a steering operator receiving a steering operation of a driver on the vehicle while traveling for a predetermined time or in a predetermined distance is equal to or less than a threshold value;
controlling at least steering of the vehicle such that the vehicle travels in a traveling lane when it is determined that the vehicle tends to depart from the traveling lane on the basis of a recognition result;
causing an output to output information for prompting the driver to grasp the steering operator when it is determined that the amount of steering is equal to or less than the threshold value;
causing the steering operator to perform a predetermined operation before the information is output from the output when it is determined that the amount of steering is equal to or less than the threshold value; and
curbing outputting of the information when a reaction to the predetermined operation is input by the driver.

While the present invention has been described in conjunction with an embodiment, the present invention is not limited to the embodiment, and various modifications and replacements can be added thereto without departing from the gist of the present invention.

What is claimed is:

1. A driving support device comprising:
a processor that executes instructions to:
recognize a surrounding situation of a vehicle;
determine whether an amount of steering which is received by a steering operator controlled by a driver of the vehicle while traveling for a predetermined time or in a predetermined distance is equal to or less than a threshold value;
control at least steering of the vehicle such that the vehicle travels in a traveling lane when it is determined that the vehicle tends to depart from the traveling lane on a basis of the surrounding situation of the vehicle; and
cause an output section to output information for prompting the driver to grasp the steering operator when the processor determines that the amount of steering is equal to or less than the threshold value,
wherein the processor causes a predetermined operation to be performed on the steering operator, to determine whether the driver is grasping the steering operator, before the information is output from the output section when the processor determines that the amount of steering is equal to or less than the threshold value, and
wherein the processor curbs outputting of the information when it is determined that the driver is grasping the steering operator in response to the predetermined operation.

2. A driving support device comprising:
a processor that executes instructions to:
recognize a surrounding situation of a vehicle;
determine whether an amount of steering which is received by a steering operator controlled by a driver of the vehicle while traveling for a predetermined time or in a predetermined distance is equal to or less than a threshold value;
control at least steering of the vehicle such that the vehicle travels in a traveling lane when it is determined that the vehicle tends to depart from the traveling lane on a basis of the surrounding situation of the vehicle; and
cause an output section to output information for prompting the driver to grasp the steering operator when the processor determines that the amount of steering is equal to or less than the threshold value,
wherein the processor curbs outputting of the information from the output section when the processor determines that the amount of steering is equal to or less than the threshold value, the driver is grasping the steering operator, and the traveling lane of the vehicle has a predetermined shape.

3. The driving support device according to claim 1, wherein the processor causes the output section to output the information when it is determined that the driver is not grasping the steering operator in response to the predetermined operation.

4. The driving support device according to claim 1, wherein the processor causes the output section to output the information for prompting the driver to grasp the steering operator when the processor determines that the amount of steering is equal to or less than the threshold value and when the driver does not grasp the steering operator or the traveling lane of the vehicle does not have a predetermined shape.

5. The driving support device according to claim 1, wherein the processor causes the predetermined operation to be performed on the steering operator before the information is output from the output section when the processor determines that the amount of steering is equal to or less than the threshold value and when the traveling lane of the vehicle has a predetermined shape.

6. A driving support device comprising:
a processor that executes instructions to:
determine whether an amount of steering which is received by a steering operator controlled by a driver of a vehicle while traveling for a predetermined time or in a predetermined distance is equal to or less than a threshold value; and
cause an output section to output information for prompting the driver to grasp the steering operator when the processor determines that the amount of steering is equal to or less than the threshold value,
wherein the processor causes a predetermined operation to be performed on the steering operator, to determine whether the driver is grasping the steering operator, before the information is output from the output section when the processor determines that the amount of steering is equal to or less than the threshold value, and curbs outputting of the information when it is determined that the driver is grasping the steering operator in response to the predetermined operation.

7. A driving support device comprising:
a processor that executes instructions to:
recognize a surrounding situation of a vehicle;
determine whether an amount of steering which is received by a steering operator controlled by a driver of the vehicle while traveling for a predetermined time or in a predetermined distance is equal to or less than a threshold value; and
cause an output section to output information for prompting the driver to grasp the steering operator when the processor determines that the amount of steering is equal to or less than the threshold value,
wherein the processor curbs outputting of the information from the output section when the processor determines that the amount of steering is equal to or less than the threshold value, the driver is grasping the steering operator, and a traveling lane of the vehicle has a predetermined shape.

8. A driving support method that is performed by a computer, the driving support method comprising:
recognizing a surrounding situation of a vehicle;
determining whether an amount of steering which is received by a steering operator controlled by a driver of the vehicle while traveling for a predetermined time or in a predetermined distance is equal to or less than a threshold value;
controlling at least steering of the vehicle such that the vehicle travels in a traveling lane when it is determined that the vehicle tends to depart from the traveling lane on a basis of the surrounding situation of the vehicle;
causing an output section to output information for prompting the driver to grasp the steering operator when it is determined that the amount of steering is equal to or less than the threshold value;
causing a predetermined operation to be performed on the steering operator, to determine whether the driver is grasping the steering operator, before the information is output from the output section when it is determined that the amount of steering is equal to or less than the threshold value; and
curbing outputting of the information when it is determined that the driver is grasping the steering operator in response to the predetermined operation.

9. A non-transitory computer-readable storage medium storing a program, the program causing a computer to perform a process comprising:
recognizing a surrounding situation of a vehicle;
determining whether an amount of steering which is received by a steering operator controlled by a driver of the vehicle while traveling for a predetermined time or in a predetermined distance is equal to or less than a threshold value;
controlling at least steering of the vehicle such that the vehicle travels in a traveling lane when it is determined that the vehicle tends to depart from the traveling lane on a basis of the surrounding situation of the vehicle;
causing an output section to output information for prompting the driver to grasp the steering operator when it is determined that the amount of steering is equal to or less than the threshold value;
causing a predetermined operation to be performed on the steering operator, to determine whether the driver is grasping the steering operator, before the information is output from the output section when it is determined that the amount of steering is equal to or less than the threshold value; and
curbing outputting of the information when it is determined that the driver is grasping the steering operator in response to the predetermined operation.

* * * * *